Lundgren

[11] 3,740,112
[45] June 19, 1973

[54] MULTIPLE IMAGE OPTICAL DEVICE
[76] Inventor: Edward Thomas Lundgren, 83 Twig Lane, Levittown, N.Y.
[22] Filed: Mar. 22, 1971
[21] Appl. No.: 126,631

[52] U.S. Cl. ................... 350/96 T, 350/4, 353/1
[51] Int. Cl. .................... G02b 5/14, G02b 27/08
[58] Field of Search .................... 350/96 T, 4, 5; 353/1, 2

[56] References Cited
UNITED STATES PATENTS
3,170,980  2/1965  Pritchard ..................... 350/96 T X
2,051,392  8/1936  Rantsch et al. ............. 350/96 T UX
2,155,565  4/1939  Schmidt ........................... 350/4 X
3,066,571  12/1962  Shaffer ............................... 350/4
3,237,512  3/1966  Beverett ............................ 353/2

*Primary Examiner*—John K. Corbin
*Attorney*—Robert R. Strack and James A. Eisenman

[57] ABSTRACT

An optical device for creating geometric patterns based upon actual viewed objects, comprising an elongated tube having a polygonal transverse cross-section. The inner walls of the tube are made reflective to create multiple reflections of light impinging through the open end, and these walls may be made transparent and color restrictive to enhance the apparent brightness and beauty of the pattern developed.

8 Claims, 6 Drawing Figures

INVENTOR.
EDWARD THOMAS LUNDGREN
BY
Eisenman and Strack
ATTORNEYS

F ERECT

ᴲ INVERTED

ᖶ REVERTED

ᘔ INVERTED & REVERTED

INVENTOR.
EDWARD THOMAS LUNDGREN
BY Eisenman and Stack
ATTORNEYS

MULTIPLE IMAGE OPTICAL DEVICE

BACKGROUND OF THE INVENTION

1. Field of the Invention

This invention relates to an optical device; and, more particularly, to an optical device operative to transmit light images to a light responsive receptor with a variety of reflections.

2. Description of the Prior Art

The development of interesting optical images has been investigated for many years for both esthetic and scientific reasons. It has long been known that pleasing and interesting visual effects can be created by the utilization of mirrors and colored filters. Perhaps the most famous device for viewing with the human eye is the kaleidoscope, invented by Sir David Brewster, in the 17th century. The kaleidoscope works on the principal of multiple reflection. Two glass plates are disposed along the length of a tube and slanted toward each other. At one end of the tube two further plates are disposed, one of clear glass and the other of ground glass. The clear glass is positioned closer to the eyehole which is at the other end of the tube, and pieces of colored beads, glass, or other objects, are placed between the plates. By exposing the remote end of such a device to light, the colors presented by the beads and glass are reflected in the mirrors and form beautiful patterns. As the colored objects are shifted in position, the reflected patterns change in substantially unlimited variation.

Kaleidoscopic effects are generally employed for their esthetic qualities; however, they may also be utilized in conjunction with certain scientific experiments. The present invention is similarly suitable for use both in the development of visually pleasing and interesting designs and potentially in the scientific examination of multiple reflection characteristics.

SUMMARY OF THE INVENTION

The present invention relates to structures which are developed in tubular form and which may be used to achieve a visual effect quite similar to that of the kaleidoscope.

An object of the invention is to provide an optically reflective device which produces images in interesting patterns.

Another object of the present invention is to provide an optical device comprising a single integral element capable of producing kaleidoscopic effects while viewing conventional objects.

Another object of the invention is to provide an optical device which upon rotation creates the impression of multiple moving images which individually rotate at varying rates of speed.

Another object of the invention is to provide an easily and economically manufactured article which may be employed for generating geometric patterns based upon a diversity of every day images.

In accordance with the invention, there is provided an optical device comprising an elongated hollow tube. The transverse cross section through this tube forms a polygon and the inner faces of the walls of the tube are reflective. By placing one's eye at one end of this tube, and providing an image at the other end, multiple reflections are revealed which form interesting and difficult to reassemble reflections of the image.

In accordance with further embodiments of the invention, the walls of the tube may be provided with light transmissive characteristics in order to enhance the visual effects created. In certain instances, these light transmissive characteristics may include color filtering and accordingly create a multi-colored pattern for presentation to the eye, or other light receptive means.

The above mentioned objects and features of the present invention, as well as others, will be more clearly understood and appreciated from the following detailed description which is made in conjunction with the drawings.

DESCRIPTION OF THE PREFERRED EMBODIMENT

Figure 1:
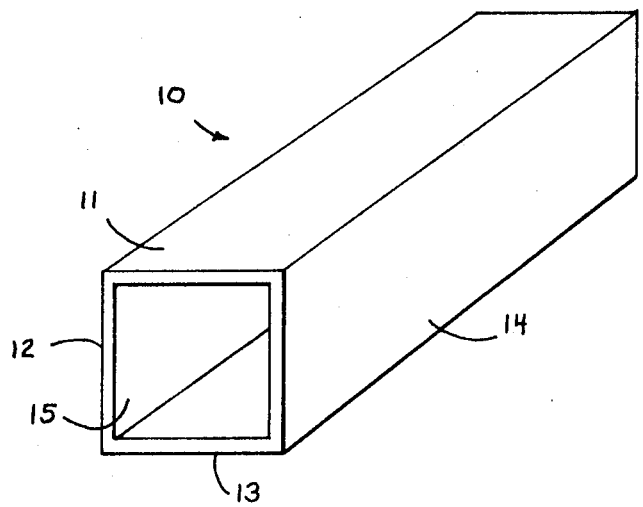
FIG. 1 is a perspective view of one embodiment of the invention comprising a tube having a square transverse cross-section.

As shown by FIG. 1, a particular embodiment of the invention 10 may be of extremely simple form. In the illustrated embodiment, the device is constructed of four walls 11, 12, 13, and 14, each being joined at substantially right angles to the adjacent wall. The inner surface 15 of each wall is reflective. In order to operate the device, one would place either his eye or another light responsive means at one end thereof and direct the device at some object to be viewed. The viewed object may be either proximate to the other end of the device or spaced any distance therefrom. As will be explained in more detail hereinafter, the reflectivity of the walls of this device is effective to create a multiplicity of reflected images of the object viewed. When the walls are also provided with light transmission characteristics, the reflected images will not only include the object viewed through the window or aperture of the tube, but also direct and reflected images of objects viewed through the walls of the device.

Walls 11, 12, 13, and 14 are preferably rigid; however, in some devices it may be deemed desirable to use flexible materials. It is also preferable to use parallel walls. The inner wall reflectivity may be achieved through use of a polished surface. If desired, striations or other discontinuities may be introduced onto or into such surfaces. Acrylic plastics are suitable materials for the walls.

Utilizing a device of the structure shown, one is able to generate a multiplicity of images utilizing everyday objects. These images are fragmented, inverted, reverted, and, in some cases, given added hue, in order to create interesting and esthetically pleasing geometric patterns. Furthermore, by rotating the device about its longitudinal axis, the images are seen to rotate at different speeds.

It will be appreciated that the optical device of the present invention is primarily a hollow tube or column having a transverse section therethrough which yields a polygon. The minimum number of faces for such a polygon would be three, in which case the cross-section of the tube is in the form of a triangle. The sides of the polygon may be increased to any number desired in accordance with the geometrical pattern to be developed. The image production within the tube is created by means of Fresnel reflection from the polished or reflective inner faces of the tube walls. The series of images are created in patterns which are a function of the number of faces of the tube, inasmuch as the number of faces determines the dihedral angle between any two adjacent faces. For example, an equilateral triangle will produce 60° dihedral angles, a square or rectangle will produce 90° dihedral angles, and a pentagon will produce 108° dihedral angles.

Figure 2:
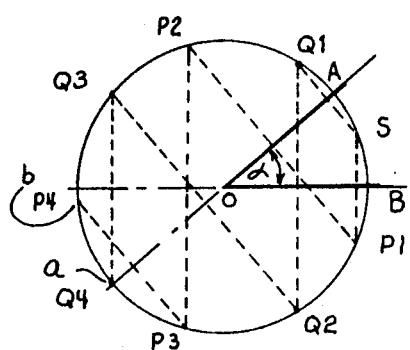
FIG. 2 is a schematic illustrating the construction of images in a pair of inclined reflecting faces.

The theory of successive reflections from two inclined reflecting faces is basic to an understanding of the multiple images and patterns that are developed with the present device. Thus, one may consider the single acute dihedral angle $\alpha$ illustrated in FIG. 2. In this Figure, line OA and line OB define sections of two reflecting faces which are generated by a plane drawn through an object S perpendicular to both faces.

If a line perpendicular to reflecting face OA, be drawn from point S through OA to $Q_1$, such that line $SQ_1$ is bisected by the reflecting face of OA, point $Q_1$ will be the focus of the rays from S after one reflection at OA. Drawing a similar perpendicular line from point $Q_1$ through the second reflecting face OB to a point an equal distance on the other side of face OB, will define point $Q_2$ which is focus of the rays from S after a second reflection. This procedure may be repeated in order to develop points $Q_3$ and $Q_4$ as the focus of the rays after third and fourth reflections respectively.

Similarly, another series of images, or focal points, $P_1$, $P_2$, $P_3$, and $P_4$, may be developed by taking the rays which are initially incident on the reflecting face OB. With an understanding of this construction, it follows that $OQ_1 = OS$, and $OQ_2 = OQ_1 = OS$. Therefore, all the images lie on the circumference of a circle having a center at O, and the radius OS.

To determine the position of the images, let the arc $SA = \Theta$, $SB = \Theta'$ and $AB = \Theta + \Theta' = \alpha$.
Then the arc
$SQ_1 = 2SA = 2\Theta$
$SQ_2 = BS + BQ_2 = SQ_1 + 2BS = 2\Theta + 2\Theta' = 2\alpha$
$SQ_3 = AS + AQ_2 = SQ_2 + 2AS = 2\alpha + 2\Theta$, etc.
Similarly,
$SP_1 = 2\Theta'$, $SP_2 = 2\alpha$, $SP_3 = 2\alpha + 2\Theta'$, etc.
In general, the distance in the first series are
$SQ_{(2n)} = 2n\alpha$, $SQ_{(2n+1)} = 2n\alpha + 2\Theta$
and in the second series,
$SP_{(2n)} = 2n\alpha$, $SP_{(2n+1)} = 2n\alpha + 2\Theta'$.

When any one of the images falls on the arc $ab$, between the reflecting surfaces produced, it lies behind both reflecting surfaces and, therefore, no further reflection takes place. If the image $Q_{2n}$ be the first to fall on the arc $ab$, then, since it is one of the images which lie behind the second reflecting face, the arc $SQ_{2n} > SBa$, that is $2n\alpha > \pi - \Theta$ or $2n > (\pi - \Theta)/\alpha$.

If the first image that falls on the arc $ab$ be one of those behind the first reflecting surface, say $SQ_{(2n+1)}$, then, $SQ_{(2n+1)} > SAb$;
that is, $2n\alpha + 2\Theta > \pi - \Theta'$, or $2n\alpha + \Theta + \Theta' > \pi - \Theta$
or, $2n+1 > (\pi-\Theta)/\alpha$.

It will be seen that this is the same result as before, $2n$ being the number of images in the first case, $2n+1$ in the second. Therefore, the whole number of images in the first series is the integer next greater than $\pi - \Theta/\alpha$; and, in like manner, the number of images in the second series may be shown to be the integer next greater than $\pi - \Theta'/\alpha$.

If $\alpha$ is a submultiple of 180° $\pi/\alpha$ will be a whole number and the number of images in each series will be $\pi/\alpha$, since $\Theta/\alpha$ and $\Theta'/\alpha$ are proper fractions; so that the total number of images will be $2\pi/\alpha$. In this case, two of the images of the different series coincide, because if $\pi/\alpha$ is an even integer, e.g., $2n$, then
$SQ_{2n} + SP_{2n} = 2n\alpha + 2n\alpha + 2\pi$,
and therefore the images $Q_{2n}$, $P_{2n}$ coincide. If $\pi/\alpha$ is an odd integer, e.g., $2n + 1$, then
$SQ_{(2n+1)} + SP_{(2n+1)} = 2n\alpha + 2(\Theta + \Theta') = (4n+2)\alpha = 2\pi$,
and the images $Q_{(2n+1)}$, $P_{(2n+1)}$ coincide.

Figure 3:
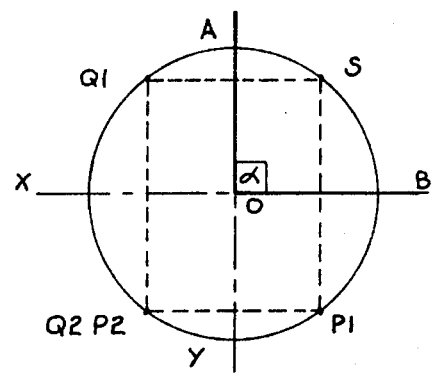
FIG. 3 is a schematic illustrating the images formed by a 90° dihedral angle between reflecting faces.

If, therefore, the object is included in the number, the total number of images is $2\pi/\alpha$. This is illustrated in FIG. 3 for a 90° angle of inclination. Object S is imaged with inversion by side OX, and with reversion by sidy OY. The inverted and reverted image corresponds to the superimposition of the secondary reflections of the two primary images. Thus the total number of images, plus the object that are seen, equals four, i.e., ($2\pi$)/90°. Or there are three images seen, plus one object.

Figure 4:
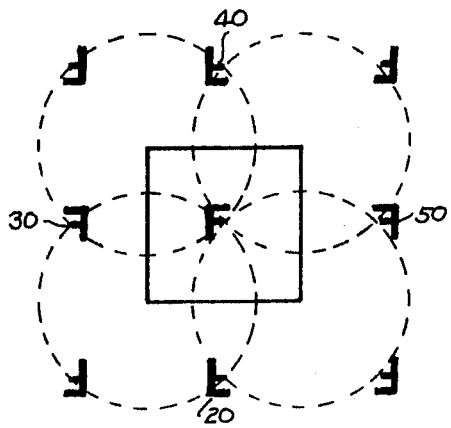
FIG. 4 is a schematic illustrating the images formed by four 90° dihedral angles assembled as a square section.

By providing a system of four such angles, as in the embodiment of FIG. 1, the schematic of FIG. 4 suggests the effects produced. Each corner produces three images of an object "F", for a total of 12 images, plus a common object, or 13. However, each of the four sides of the square is common to two corners, hence the four images are at points 20, 30, 40, and 50 superimposed. Therefore, there is visually available a total of eight images, plus the object. Put another way, eight images of the square column surround the actual square column. Each column image contains an image of the object "F".

FIG. 4 schematically illustrates the image pattern for a square tube with the image proximate to the remote end. Theoretically, with a tube of infinite length and perfect reflectivity, the pattern would extend outward indefinitely. From a practical standpoint, the images are limited to several orders of reflections due to decreasing brightness, as reflection losses mount. As noted above, eight reflected images surround the actual image square. These in turn are surrounded by 16 images. Thus, $n$ tiers of images will produce $8n$ additional images, viz, 8, 16, 24, 32 . . . The total images in all tiers, plus the object, that are seen will be $$1 + \sum_{n=1}^{t} 8n$$

A similar analysis may be applied to polygons of any number of sides.

Figure 5:
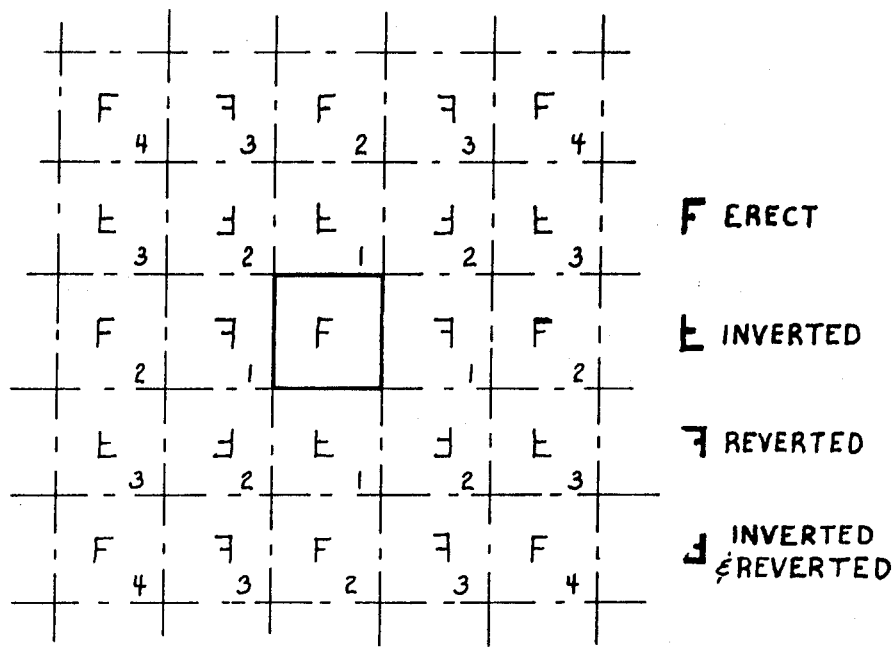
FIG. 5 is a layout of the successive images produced by a device having a square cross-section of the type shown in FIG. 1.

FIG. 5 represents a portion of the geometric pattern produced by a square tube. For purposes of discussion each image square may be identified by a two-part numerical designation wherein the first digit represents its X-axis position and the second digit represents its Y-axis position. Assuming the lower left image square in FIG. 5 to be 1—1, the directly viewed object will appear in window square 3—3. The lower right corner of each image square contains a digit representing the order of the reflected image. Thus, squares 2–3, 3–4, 4–3, and 3–2 are primary reflections and squares 2—2, 1–3, 2–4, 3–5, 4—4, 5–3, 4–2, and 3–1 are secondary reflections.

When viewing an object located proximate to the remote end of the device, the effect of the viewed pattern is created by several factors. First, the primary image will assume various positions due to either inversion or reversion. The orientation of the images will be either inverted or reverted for odd numbered reflections, or inverted and reverted for even numbered reflections. Second, each square will have a brightness determined by the order of the reflection present. The brightest image will be that of the actual object and this will be dampened as reflectivity losses take effect. This will be explained in more detail below.

Intriguing effects may be produced by rotating the device about its longitudinal axis. When this is done, the odd reflection images rotate at twice the angular velocity and the even images appear to rotate at a rate equal to the angular velocity.

When viewing an object that is displaced from the remote end of the device by a measurable amount, a further effect is created because the inner walls reflect more than the object that is visible through the window of the tube. In these situations, the pattern formed is not simply inversions and reversions of the actual object in the principal square; rather, the primary reflections include images of the areas of a viewed object that are proximate to the viewed area, but beyond the boundaries established by the dimensions of the window. This creates a geometric pattern of segmented and disoriented portions of actual objects which may be quite hard to reassemble in the mind of the viewer.

The change in tone or brightness of the various images is determined, as noted above, by the reflectivity of the walls. Since Fresnel reflection depends upon the angle of incidence and this varies with image position due to the number of reflections, two factors reduce the image brightness; the number of reflections, and the variation in the angle of incidence related to the position of the image.

The angle of incidence as a function of $j$ reflections for an object on-axis, and for a column of length $l$ and width $x$ is $$\tan i_j = l/jx \quad (1)$$

$$\sin r_j = \sin i_j/n' \quad (2)$$

where:
$i_j$ = angle of incidence after $j$ reflections
$r_j$ = angle of refraction after $j$ reflections
$n'$ = index of refraction Thus, with Equation (1) one can find $i$, and Snell's Law, Equation (2), yields $r$. Substitution in Fresnel's equation, raised to the $j$th power yields the final reflection efficiency.

$$\rho_1 = \sin^{2j}(i_j-r_j)/\sin^{2j}(i_j+r_j)$$

$$\rho_2 = \tan^{2j}(i_j-r_j)/\tan^{2j}(i_j+r_j)$$

where: $i$ and $r$ are the angles of incidence and refraction and $\rho_1$ and $\rho_2$ are the reflection factors for light polarized in and perpendicular to the plane of incidence.

The discussion thus far has dealt primarily with a device having opaque walls. The apparent brightness and esthetic effect of the developed geometric patterns can be greatly heightened by the use of transparent walls. When this is done, objects lying outside the entrance window will be seen through the transparent walls. These objects will, of course, be reflected also by the faces of the walls and these additional images will be superimposed upon the above discussed array of images.

Figure 6:
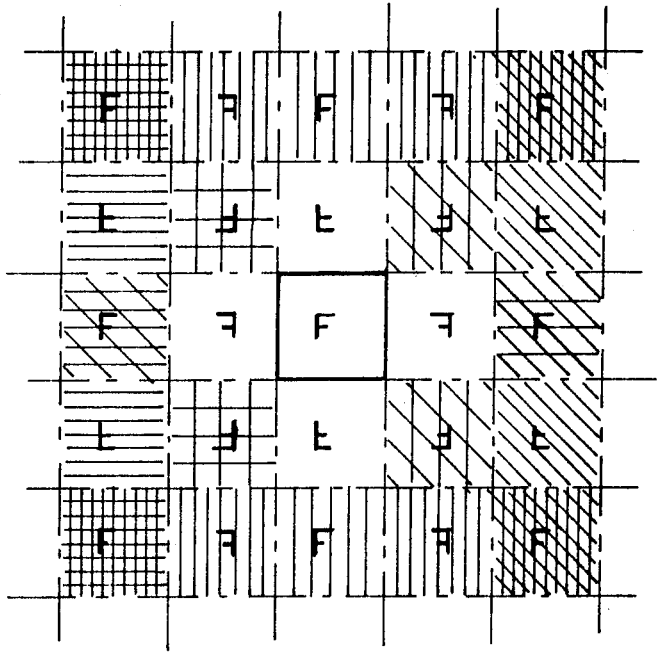
FIG. 6 is a layout of the successive images produced by a device having a square cross-section of the type shown in FIG. 1, wherein the walls are of different colors.

A still further development involves the use of colored transparent walls. This provides a display of varying colors, determined by the particular filtering properties of the material used. FIG. 6 is a schematic suggesting the effects achieved by using several colors; however, the black and white rendition is inadequate to depict the true visual impact created by different colors and varying brightness.

FIG. 6 is a rough black and white approximation of the pattern produced with a square tube having upper and lower walls of one color and side walls of two different colors. The image "F" in square 3—3 will be the object viewed. The adjacent surrounding images may appear as predominantly white light reflections due to the brightness of the light coming through the viewing windows. The next surrounding array of 16 squares will take on the hue of the particular wall involved due to light transmission therethrough and in addition will merge therewith the hue of the opposing walls as reflected therein. The shades of each color will also be affected by the brightness of the reflection in each square. These various effects are symbolically shown in FIG. 6. For example, square 3–1 has a light red hue, squares 2–1 and 4–1 have a somewhat darker red hue, and squares 1—1 and 5–1 have a still darker red hue. In addition, squares 1—1 and 5–1 will have a hue contributed by the coloring of the adjacent walls. Actually, since the objects viewed will generally be colored themselves, the final visual effect of any scene, following filtering through colored walls will be extremely difficult to predict. On the other hand, the plethora of colors and shapes have been found to inevitably produce pleasing and intriguing effects.

A particular series of illustrative embodiments have been described and explained, relative to a particular geometric shape. It will be appreciated that other forms are contemplated, and all such forms and structures as fall within the scope of the appended claims, are intended to be embraced within the spirit and teaching of this disclosure.

What is claimed is:

1. A multiple image optical device for creating a view at either end comprising an open-ended elongated hollow tube, the walls of said tube being transmissive to external light in the direction perpendicular to the axis of said tube, the transverse cross-section through said tube forming a polygon, and the inner faces of the walls of said tube being reflective to internally impinging light and at least partially transparent to said external light, said view being composed of a direct view and reflected images of objects cited through the tube, and a direct view and reflected images of objects viewed through said walls.

2. A multiple image optical device as defined in claim 1, wherein an object positioned beyond one end of said tube is reflected with diminishing brightness along the inner faces of said walls, said tube having a length approximately equal to nR where R is the widest dimension of the tube cross-section and n is the number of reflections discernible by an eye when placed in proximity to the other end of said tube.

3. A multiple image optical device as defined in claim 1, wherein the width of the aperture within said tube is less than one-fourth the length of said tube.

4. A multiple image optical device as defined in claim 1, wherein said walls transmit external white light therethrough in the direction perpendicular to the axis of said tube.

5. A multiple image optical device as defined in claim 1, wherein said walls filter said external light transmitted therethrough.

6. A multiple image optical device as defined in claim 1, wherein said walls are substantially parallel to the axis of said tube.

7. A multiple image optical device as defined in claim 6, wherein the walls are rigid.

8. A multiple image optical device as defined in claim 1, wherein said walls exhibit color filtering characteristics to said external light.

* * * * *